United States Patent [19]
Erichsen et al.

[11] Patent Number: 5,481,079
[45] Date of Patent: Jan. 2, 1996

[54] COMPACT GAS TUNGSTEN ARC WELDING TORCH APPARATUS

[75] Inventors: Thomas D. Erichsen, Los Altos; Gary L. Boerman, Santa Clara; Daniel J. Richard, San Jose, all of Calif.; Ian C. B. Gordon, East Whitburn, Scotland

[73] Assignee: FMC Corporation, Chicago, Ill.

[21] Appl. No.: 282,333

[22] Filed: Jul. 29, 1994

[51] Int. Cl.⁶ .................................................. B23K 9/00
[52] U.S. Cl. ............................................................ 219/75
[58] Field of Search ..................... 219/75, 60 A, 219/136

[56] References Cited

U.S. PATENT DOCUMENTS

| | | | |
|---|---|---|---|
| 2,571,684 | 10/1951 | Craven | 219/75 |
| 4,104,499 | 8/1978 | Luttrell et al. | 219/60 A |
| 4,629,853 | 12/1986 | Yttergren et al. | 219/60 A |
| 5,285,042 | 2/1994 | Erichsen et al. | 219/75 |

*Primary Examiner*—Clifford C. Shaw
*Attorney, Agent, or Firm*—Michael B. K. Lee; Douglas W. Rudy

[57] ABSTRACT

The invention provides an improved compact gas tungsten arc welding (GTAW) torch apparatus allows for welding on such surfaces that otherwise could not be welded with linear or 90° bend welding torch apparatuses, by providing a bend greater than 282°. The inventive torch is compact, not requiring a large radius of curvature or a water outlet pipe passing through the support housing. The inventive torch also uses one of the feed pipes as an electrical conductor.

20 Claims, 2 Drawing Sheets

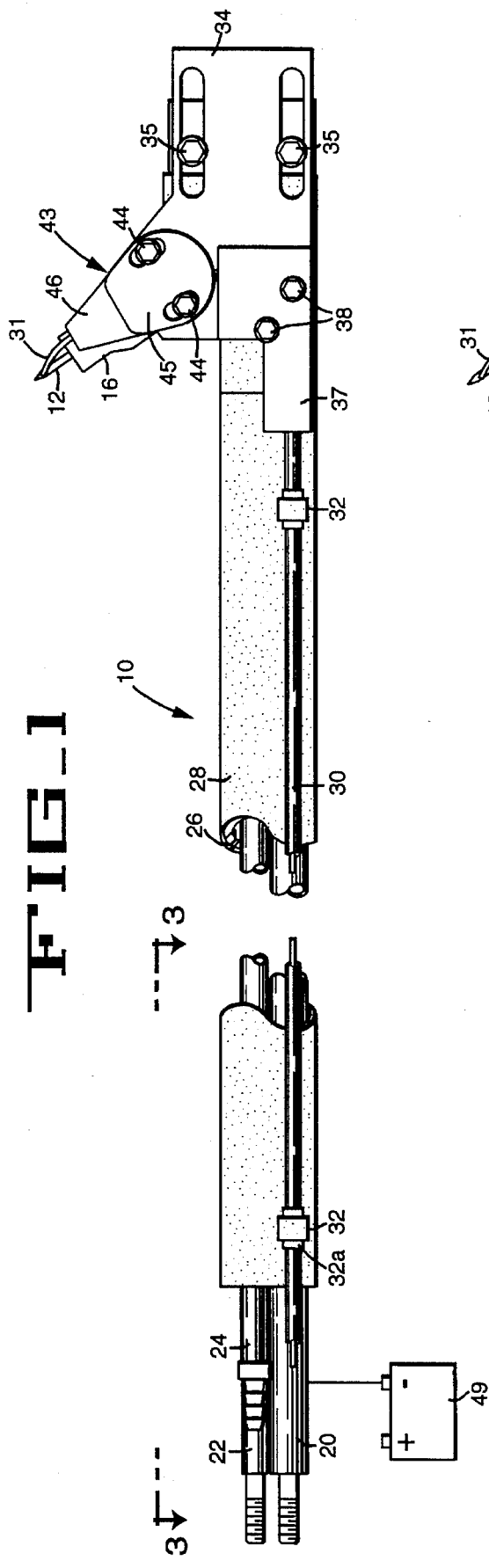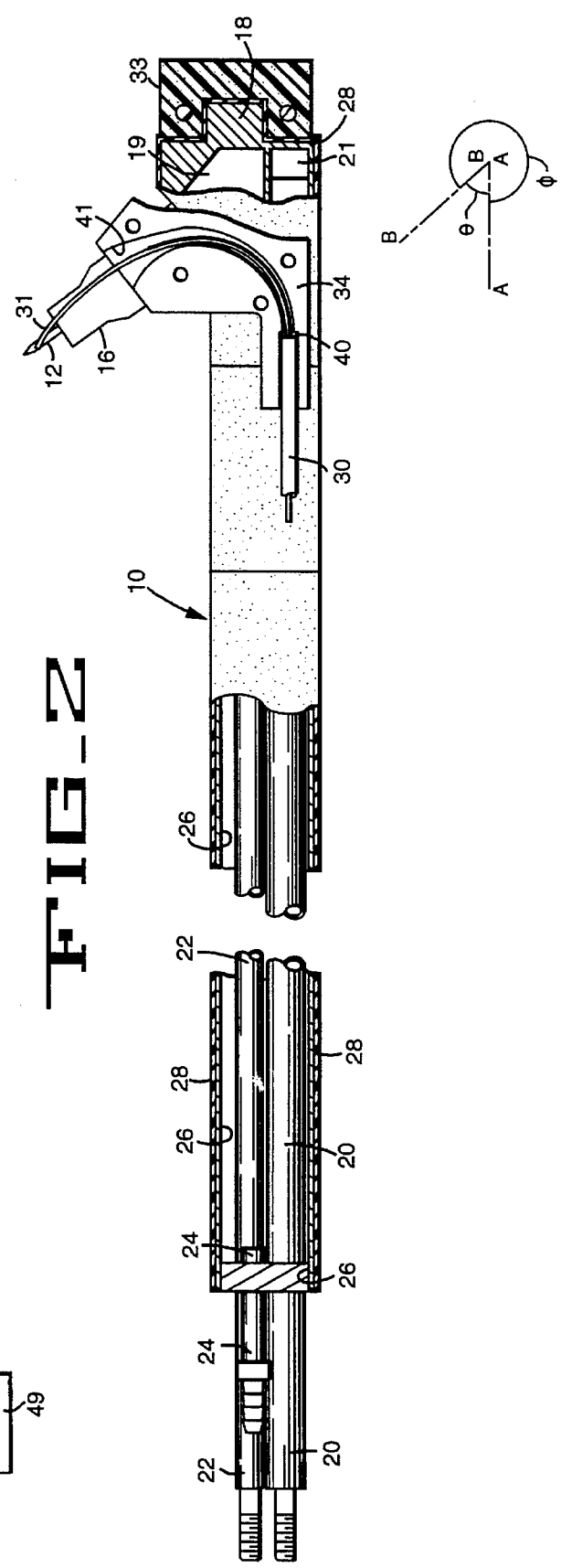

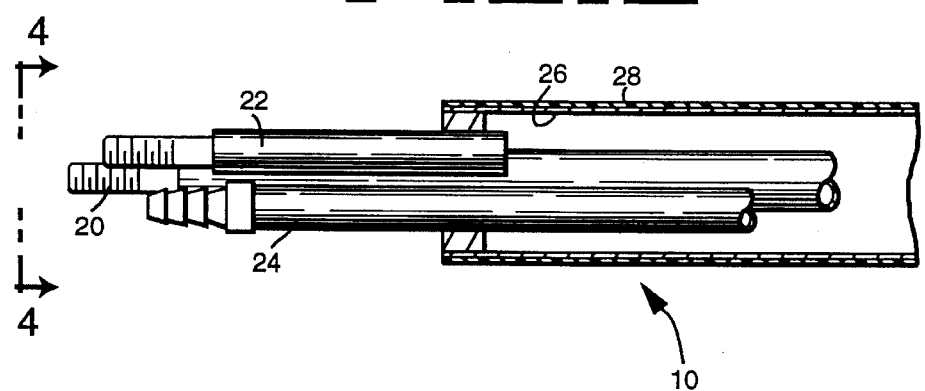
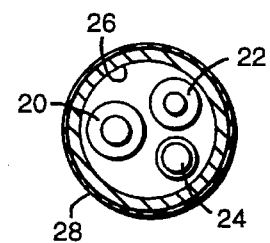
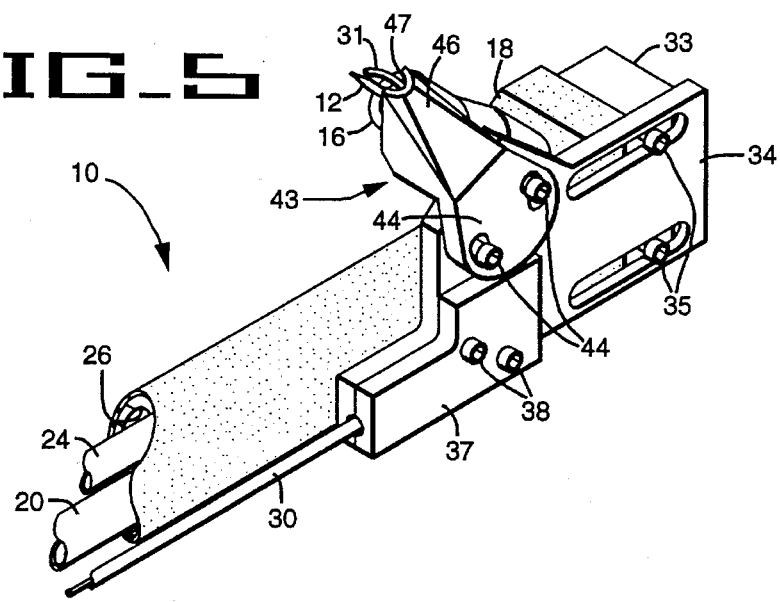

COMPACT GAS TUNGSTEN ARC WELDING TORCH APPARATUS

In welding of tubular components, sometimes it is required that welding be done on a surface that is predominately perpendicular to the major axis of the welding torch apparatus and is facing away from the non-captured end of the torch. The compact gas tungsten arc welding (GTAW) torch apparatus allows for welding on such surfaces that otherwise could not be welded with linear or 90° bend welding torch apparatuses. U.S. Pat. No. 5,285,042 provides a gas tungsten arc welding torch with a bend greater than 282°, but requires a feeder tube with a large radius of curvature. The invention provides such a welding torch, but bends the feed wire with a short radius of curvature, providing an improved compact gas tungsten arc welding torch.

FIG. 1 is a side view of a preferred embodiment of the inventive arc welding apparatus.

FIG. 2 is a partially cut away side view of the welding apparatus illustrated in FIG. 1, with pieces removed.

FIG. 3 is a cross-sectional view of the welding apparatus illustrated in FIG. 1 taken along lines 3—3 of FIG. 1.

FIG. 4 is an end view of the welding apparatus illustrated in FIG. 3 taken along lines 4—4.

FIG. 5 is a perspective view of the inventive welding apparatus.

In FIGS. 1 to 5 show views of a torch 10 of a preferred embodiment of the inventive compact arc welding torch. The torch 10 comprises an electrode 12, a ceramic cup 16 surrounding the electrode 12, an angular support piece 18 which mechanically supports the electrode 12 and the ceramic cup 16, a water inlet 20, a water outlet 22, a gas feed 24, a housing 26, and a material feed tube 30.

The water inlet 20 water outlet 22, and gas feed 24 are formed by tubes. The water inlet 20 and the gas feed 24 extend to the angular support piece 18. The water outlet 22 extends to the end of the housing 26 furthest frown the angular support piece 18. The inside of the housing 26 is used to direct water to the water outlet 22. The housing 26 is formed by a linear tube, which surrounds the water inlet 20 and the gas feed. 24. The housing formed by linear tubes has an axis, which extends from the first end of the housing 26 to the second end of the housing 26 which is parallel to the line shown by line A—A. The second end of the housing 26 is mechanically connected to the angular support piece 18. A first channel 19 in the angular support piece extends from the end of the gas feed 24 to the interior of the ceramic cup 16. A second channel 21 in the angular support piece 18 extends from the end of the water inlet 20 back to the housing 26. The angular support piece 18 supports the electrode 12 so that the electrode 12 is near the center of the ceramic cup 16. The length of the electrode 12 is parallel to the line shown by line B—B. The length of the housing 26 from the first end of the housing 26 to the second end of the housing 26 and the length of the electrode 12 from the first end of the electrode 12 to the second end of the electrode 12 forms an acute angle q of 61° and a conjugate reflex angle f of 299°. In other embodiments the acute angle q may range from 40° to 78° with the conjugate reflex angle ranging from 282° to 320°.

An electrical source 49, which is schematically shown, is connected between the water inlet 20 and the workpiece. In the preferred embodiment, the material feed tube 30 is supported: along the outside of the housing 26 by a plurality of clamps 32 with plastic insulators 32a, which electrically insulate the feed tube 30 from the housing 26.

A plate support 33 made of an electrically insulative material such as plastic is supported by the angular support piece 18. A first plate 34 is mechanically connected to the plate support 33 by first plate screws 35. The first plate has a first groove 40, which receives an end for the material feed tube 30, and which is wider than the material feed tube 30. The first plate 34 also has a second groove 41, that extends from the first groove to the area of the ceramic cup in an arc shape. The part of the second groove 41 near the first groove 40 is narrower than ,the first groove 40. The second groove 41 widens as it gets further from the first groove 40, so that parts of the second groove 41 are wider than the first groove 40 as shown. A second plate 37 is mechanically connected to the first plate 34 by second plate screws 38, covering the first groove 40 and part of the second groove 41. A tip piece 43 is mechanically connected to the first plate 34 by tip piece screws 44, covering part of the second groove 41. The tip piece 43 comprises a plate portion 45, which is a plate that covers part of the second groove 41, and a tip portion 46, which is a conic part with a tip groove 47 and which extends past the first plate 34.

The housing 26 and the angular support piece 18 are coated with an electrically insulating ceramic material coating 28, to prevent arcing and electrical conduction between the workpiece other than through the electrode 12.

The inventive torch 10 allows the providing of feed material 31 at an acute angle, without a large radius of curvature. To thread the feed material through an acute angle, the second plate 37 and the tip piece 43 are removed from the first plate 34. The end of the material feed tube 30 is placed in the first groove 40. The f feed material 31 is placed in the second groove 41 so that the feed material goes along the acute angle. The second plate 37 is mounted by screws 38 on to the first plate 34, covering the end of the material feed tube 30 and part of the second groove 41. The tip piece 43 is also mounted by screws 44 on to the first plate 34, covering part of the second groove 41. The end of the feed material 31 is placed in the tip groove 47. The threading of the inventive torch 10 is unlike the prior art where feed material passes through a tube. Passing such feed material through a tube at an acute angle with a small radius of curvature, causes the material to bind in the tube. This is avoided in the invention.

In operation of the preferred embodiment the torch 10 is connected to a control unit, not shown, by connecting the water inlet 20 to a water supply, the water outlet 22 to a water exhaust, the gas feed 24 to a gas source, an electrical source 49 is connected to the water inlet 20, the material feed tube 30 to feed material source, and the housing 26 to a mechanical support means. Water flows from the water supply to the water inlet 20, through the second channel 21 to the interior of the housing 26. The water then flows through the interior of the housing 26 to the water outlet 22. The flowing water provides cooling to the angular support piece 18, the ceramic cup 16, and the electrode 12. The second end of the electrode 12 is placed near a work piece. An inert gas flows from the gas source through the gas feed 24, through the first channel 19, through the ceramic cup 16 and around the electrode 12. The flowing gas makes an approximately 299° bend and is used to prevent the electrode 12 and the work piece from oxidizing. Either a DC or AC voltage passes from the electrical source 48 through the water inlet 20, through the angular support piece 18, through the electrode 12 to the work piece, creating an arc between the electrode 12 and the work piece, and then back to the electrical source 49. The arc between the electrode 12 and the work piece causes the work piece to heat to a high temperature causing a local area of the work piece to melt. A feed material 31 is fed through the material feed tube 30 to the first groove 40. The first groove 40 holds the material feed tube 30 in place, while allowing feed material to pass through the second groove 41. The feed material 31 passes from the second groove 41 to the tip groove 47, which directs the feed material 31 near the electrode 12. The mechanical support means is used to maintain the electrode 12 near the work piece.

In the preferred embodiment the first plate 34, the second plate 37, and the tip piece 43 are made from an as aluminum bronze alloy, so that a channel is formed which bends the feed material through an acute angle, with the channel being an aluminum bronze alloy. It has been found that an aluminum bronze alloy channel bending the feed material through an acute angle provides an anti-galling surface so that there is minimum binding between the feed material and the channel. In this embodiment, the feed material 31 is a nickel based alloy, but other materials may be used.

The ceramic cup 16 of the preferred embodiment could be replaced by other insulative material. The torch could also use coolants other than water or could be air cooled.

Because the inventive torch uses the water inlet 20 as an electrical conductor, it does not need a separate electrical conductor and uses the housing 26 as the water outlet, the diameter of the housing 26 can be kept small. The grooves in the first plate 34, and the ability to dismount the second plate 37 and the tip piece 43 :allows the feed material 31 to be threaded sideways into the grooves, without trying to push the end of the feed material 31 through an acute angle with a small radius of curvature. Therefore, the removable second plate 37 that covers the grooves and the second plate screws 38 that removably mount the second plate comprise a means for sideways threading of the feed material through an acute angle. Because of the compactness of the housing diameter and the small radius of curvature, the torch can be maneuvered in pipes of small diameter to be able to reach weld spots around the circumference of the pipe. The prior art torches with wider diameter handles or large radius of curvature feed tubes, or non-acute angles are not able to provide such welds in small diameter pipes.

While a preferred embodiment of the present invention has been shown)and described herein, it will be appreciated that various changes and modifications may be made therein without departing from the spirit of the invention as defined by the scope of the appended claims.

What is claimed is:

1. An arc welding apparatus, comprising:

a gas feed pipe;

a coolant feed pipe a housing surrounding the gas feed pipe and the coolant feed pipe, wherein the housing has a first end and a second end and a linear length extending from the first end of the housing to the second end of the housing;

a angular support piece mechanically connected to the second end of the housing;

an electrode with a first end and a second end, wherein the first end of the electrode is electrically connected to the electrical lead and mechanically connected to the angular support piece at a fixed angle with respect to the housing, and wherein the electrode has i a length from the first end to the second end, and wherein the length of the housing and the length of the electrode form a reflex angle within the range from 282° to 320°;

a feed tube with a length adjacent to the housing, wherein the feed tube has a first end and a second end;

a first plate supported by the angular support piece, with a first groove for receiving the second end of the feed tube, and a second groove for receiving feed material and wherein the second groove forms an arc from which ranges from 282° to 320°; and means for covering the first groove and the second groove.

2. The apparatus, as claimed in claim 1, further comprising a cup of electrically insulative material surrounding the electrode and mechanically connected to the angular support piece.

3. The apparatus, as claimed in claim 2, wherein the angular support piece comprises an electrically conductive body and is electrically connected between an electrical lead and the electrode.

4. The apparatus, as claimed in claim 3, further comprising a coolant outlet pipe, and wherein the angular support piece forms a first channel passing from the gas feed pipe to the cup and a second channel passing from the coolant inlet pipe to the interior of the housing, and wherein the coolant outlet pipe is in fluid connection with the housing.

5. The apparatus, as claimed in claim 4, wherein the electrode is tungsten.

6. The apparatus, as claimed in claim 5, wherein the cup is ceramic.

7. The apparatus, as claimed in claim 2, wherein the electrode is tungsten.

8. The apparatus, as claimed in claim 7, wherein the cup is ceramic.

9. The apparatus, as claimed in claim 2, further comprising an electrically insulative coating surrounding the housing and the angular support piece.

10. The apparatus, as claimed in claim 9, wherein the coating is a ceramic material.

11. An arc welding apparatus, which provides feed material, comprising:

a gas feed pipe;

a coolant feed pipe a housing surrounding the gas feed pipe and the coolant feed pipe, wherein the housing has a first end and a second end and a linear length extending from the first end of the housing to the second end of the housing;

an angular support piece mechanically connected to the second end of the housing;

an electrode with a first end and a second end, wherein the first end of the electrode is electrically connected to the electrical lead and mechanically connected to the angular support piece at a fixed angle with respect to the housing, and wherein the electrode has a length from the first end to the second end, and wherein the length of the housing and the length of the electrode form a reflex angle within the range from 282° to 320°;

a feed tube with a length adjacent to the housing, wherein the feed tube has a first end and a second end;

means for supporting the second end of the feed tube and the feed material at the second end of the feed tube; and means for sideways threading of the feed material through an acute angle, wherein the means for sideways threading comprises:

a removable cover which is mechanically connected to the angular support piece, and may be removably detached from the angular support piece; and a groove between the removable cover and the angular support piece, which is removably covered by the removable cover, and wherein the groove forms the acute angle.

12. The apparatus, as claimed in claim 11, further comprising a cup of electrically insulative material surrounding the electrode and mechanically connected to the angular support piece.

13. The apparatus, as claimed in claim 12, wherein the angular support piece comprises an electrically conductive body and is electrically connected between an electrical lead and the electrode.

14. The apparatus, as claimed in claim 13, further comprising a coolant outlet pipe and wherein the angular support piece forms a first channel passing from the gas feed pipe to the cup and a second channel passing from the coolant inlet pipe to the interior of the housing, and wherein the coolant outlet pipe is in fluid connection with the housing.

15. The apparatus, as claimed in claim 14, wherein the electrode is tungsten.

16. The apparatus, as claimed in claim 15, wherein the cup is ceramic.

17. The apparatus, as claimed in claim 12, wherein the electrode is tungsten.

18. The apparatus, as claimed in claim 17, wherein the cup is ceramic.

19. The apparatus, as claimed in claim 12, further comprising an electrically insulative coating surrounding the housing and the angular support piece.

20. The apparatus, as claimed in claim 19, wherein the coating is a ceramic material.

* * * * *